US008810401B2

(12) United States Patent
Karttaavi et al.

(10) Patent No.: US 8,810,401 B2
(45) Date of Patent: Aug. 19, 2014

(54) DATA PROCESSING APPARATUS AND ASSOCIATED USER INTERFACES AND METHODS

(75) Inventors: Timo Petteri Karttaavi, Espoo (FI); Ikka-Hermanni Hakala, Helsinki (FI); Risto Heikki Sakari Kaunisto, Espoo (FI); Aarno Tapio Parssinen, Espoo (FI)

(73) Assignee: Nokia Corporation, Espoo (FI)

( * ) Notice: Subject to any disclaimer, the term of this patent is extended or adjusted under 35 U.S.C. 154(b) by 345 days.

(21) Appl. No.: 13/255,085

(22) PCT Filed: Mar. 16, 2009

(86) PCT No.: PCT/EP2009/001926
§ 371 (c)(1),
(2), (4) Date: Nov. 30, 2011

(87) PCT Pub. No.: WO2010/105633
PCT Pub. Date: Sep. 23, 2010

(65) Prior Publication Data
US 2012/0068813 A1    Mar. 22, 2012

(51) Int. Cl.
*G08B 13/14*    (2006.01)

(52) U.S. Cl.
USPC .............. 340/572.1; 340/572.4; 340/572.7; 235/375; 235/382; 235/385

(58) Field of Classification Search
USPC ......... 340/572.1, 572.4, 572.7; 235/375, 382, 235/385
See application file for complete search history.

(56) References Cited

U.S. PATENT DOCUMENTS

| | | | |
|---|---|---|---|
| 5,726,916 | A | 3/1998 | Smyth |
| 6,456,262 | B1 | 9/2002 | Bell |
| 7,117,024 | B1 | 10/2006 | Dorfman |
| 7,515,054 | B2 | 4/2009 | Torch |
| 7,719,424 | B2 * | 5/2010 | Steil ........................ 340/572.4 |
| 8,427,678 | B2 * | 4/2013 | Mizumukai ................ 358/1.15 |
| 2006/0202032 | A1 * | 9/2006 | Kricorissian ............... 235/435 |
| 2007/0057842 | A1 | 3/2007 | Coleman |
| 2007/0206090 | A1 | 9/2007 | Barraud |
| 2008/0088518 | A1 | 4/2008 | Charash |

FOREIGN PATENT DOCUMENTS

| | | |
|---|---|---|
| CN | 1742278 | 3/2006 |
| CN | 1893587 | 1/2007 |
| CN | 1906564 | 1/2007 |
| CN | 101374230 | 2/2009 |

OTHER PUBLICATIONS

Search Report in GB Application No. GB0911067.7 dated Sep. 21, 2009.
Search Report for Chinese Patent App. No. 200980158122.0—Dated Aug. 20, 2013, 2 pages.
Reilly, D. et al., "Marked-up maps: combining paper maps and electronic information resources", Pers Ubiquit Comput, 2006, vol. 10, pp. 215-226.
Rohs, M. et al., "Map Navigation with Mobile Devices: Virtual versus Physical Movement with and without Visual Context", ICMI'07, Nov. 12-15, 2007, ACM 978-1-59593-817-6/07/0011, pp. 146-153.
Schoning, J. et al., "Interaction of Mobile Camera Devices with physical maps", 2006, 4 pages.

* cited by examiner

*Primary Examiner* — Tai T Nguyen
(74) *Attorney, Agent, or Firm* — Locke Lord LLP

(57) ABSTRACT

A processor (108) configured to associate (302) RFID data (124) obtained from a scene (202) with captured image data for the scene (202). The association can be displayed (304) to a user to enable a user to select (306), using the image data, which RFID data to interact (308) with.

18 Claims, 4 Drawing Sheets

DATA PROCESSING APPARATUS AND ASSOCIATED USER INTERFACES AND METHODS

TECHNICAL FIELD

The present disclosure relates to the field of data processing apparatus, associated methods, computer programs and user interfaces. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g. telecommunication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Radio-frequency identification (RFID) is a technology where objects are equipped with information-bearing tags or transponders. The information can be read using radio waves with the purpose of identification or tracking of the objects. Basic RFID provides typically barcode-type information. Extended functionality can also include providing sensor data acquired by the tag. Currently, solutions exist widely for product tracking in transport logistics and, for example, road toll monitoring. The reading distance varies greatly depending on the system implementation. Very short range enables the selecting of a single tag by bringing the reader close to the object. Long-range systems can be used to read simultaneously many tags within the reader range. Currently deployed systems operate typically at 140 KHz, 13 MHz, 900 MHz, and 2.4 GHz frequency bands.

In current RFID systems, to communicate with a specific tag, a short range system must be used or, alternatively, the tag identification must be known in advance. With a short range system, the tags outside the reader range will not return a signal to the reader. If the tag identification is known, it can be used as an address to distinguish it from other tags within the reader range.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect of the invention, there is provided a processor configured to associate radio-frequency identification (RFID) data obtained from a scene with captured image data for the scene.

It will be appreciated that a "processor" can be a collection of one or more individual processing elements which may or may not be located on the same circuit board, or same region/position of a circuit board. The same or different processor/processing elements may perform one or more of the (aforementioned or subsequent mentioned) functions.

The association between the RFID data obtained from a scene with the captured image data can provide a convenient way for a user to access RFID data using the captured image data. This can be particularly advantageous in embodiments where RFID data is received from a plurality of RFID tags and a user desires to interact with a specific one or more of the RFID tags.

The association could be performed by a processor that is local to the scene, for example in a portable electronic device that is exposed to the scene, or may be performed by a processor that is remote from the scene. In this way, RFID data and or captured image data may be transmitted from a device that is local to the scene to a processor of a remote device/server for performing the association.

Embodiments of the invention can relate to the presentation in a simplified manner of complex issues about how to make a selection of an RFID data source in an environment populated with RFID tags. This can reduce user confusion and simplify the tag/object of interest selection process in what would otherwise be a confusing environment for a user to interact with.

One or more embodiments of the invention can take advantage of RFID data obtained by directional RFID readers such that an association between the captured image data representative of a scene, or a sub-region of the captured image data, and RFID data originating from the scene can be performed.

The processor may be configured to allow user access to the RFID data by use of the image data for the scene. In this way, the user can utilise a graphical association between the RFID data and the scene to access the RFID data, and this can help ensure that the user accesses the desired RFID data, for example from a desired RFID tag. The captured image data can be used as a visual aid to point an RFID reader (either manually or automatically) at a desired RFID data source in order to interact with the desired RFID data source.

The processor may be configured to associate the RFID data with a corresponding region of the captured image data for the scene, possibly a sub-region of the captured image data. Identifying a corresponding region can enable an association between the RFID data and a location in the scene to be displayed to a user. This can enable a user to unambiguously access desired RFID data and/or access RFID data associated with a desired location in the scene.

The processor may be configured to associate the radio-frequency identification data with corresponding regions in a succession of captured video image data for the scene. In this way, the processor may be configured to process received video image data in real-time such that a user can manually move a device associated with the processor to identify the location of any RFID data sources/tags in their vicinity. The user can then select with which, if any, of the RFID data sources to interact. Selecting an RFID data source may involve pointing an antenna, such as a fixed beam antenna, at the RFID data source and instigating a processing operation. In some embodiments, a user interface may provide an indication that an antenna is pointing towards an RFID data source by changing the colour of an identifier of the RFID data source that is displayed to a user, for example by highlighting or changing the colour of a box that identifies the location of the RFID data source.

The processor may be configured to display the association between the RFID data and the captured image data. The processor may be configured to allow user access to the RFID data by selection of a corresponding region or sub-region of the captured image data. User selection of a region of the captured image data may comprise a user pressing a region of a touch-sensitive screen that corresponds to the desired region of the displayed image data, and/or scrolling through the available regions that are associated with an RFID data source using navigation keys associated with a user interface.

The processor may be configured to identify a location of a source of the RFID data in the scene and associate the RFID data with a corresponding location on the captured image data. Associating the location of the source of RFID data with a corresponding location in the captured image data may comprise converting from a coordinate format of the location of the RFID data into a coordinate format suitable for overlaying with the captured image data, for example converting from spherical coordinates to Cartesian coordinates. Such a conversion may involve using an estimated value for the radial distance of the spherical coordinates based on operating parameters such as the range of an associated RFID reader and/or an input signal representative of the distance to the RFID data source.

The processor may be configured to discriminate a location of a particular source of particular RFID data from other sources of RFID data in the scene and associate the particular RFID data with a corresponding particular location on the captured image data.

The RFID data may be representative of information received from one or more RFID tags/data sources. Information received from an RFID tag may be distinguishable from information received from other RFID tags. The RFID tags may be distinguishable by identifying a location/direction from which the RFID data is received such as by receiving information regarding an orientation from a steerable antenna or a physical orientation of an associated device when the RFID data was received.

The processor may be configured to associate the RFID data with image data based upon initiation of image capture for the scene, or following image capture, or during image capture, or in real-time as video images are generated, for example.

Image capture may comprise receiving one or more still images or video image capture. Image capture may comprise receiving images directly from an image sensor such as a digital camera, or may comprise downloading images from a network, such as the Internet.

There may be provided an apparatus comprising a processor as disclosed herein, an image sensor to capture image data for a scene, and an RFID reader to receive RFID data from the scene.

The RFID reader may comprise a steerable antenna, such as a phased array antenna. Such a steerable antenna may be automatically steerable or may be manually steerable by a user physically changing the orientation of the RFID reader relative to the scene.

The processor may be configured to associate the image data with radio-frequency identification data in accordance with characteristics of the image data. Characteristics of the image data can include a degree to which an image sensor applied a zoom function when capturing the image data, and a frame rate of received video image data, for example.

One or more characteristics of the image data and/or an image sensor may be used to control how the RFID data is received and/or used/processed. The image sensor may be a still image camera or a video camera that is used to capture the image data. A field of view/boundaries represented by the image data may be used to restrict the field of view/boundaries from which RFID data is received. For example, apparatus comprising a camera (either still or video) that is being used to provide zoomed-in image data may be used such that a corresponding RFD antenna is used to only scan for RFID data sources from the scene that is represented by the zoomed in image data. This may be a sub-area of the total area that an antenna can scan, and can save power and/or processing time, for example and may provide a more efficient and/or economical apparatus.

The RFID tag can be an active or a passive tag.

There may be provided a portable electronic device comprising a processor as described herein or an apparatus as described herein.

The apparatus may be a module for a portable electronic device.

According to a further aspect of the invention, there is provided a method of data processing comprising:
associating RFID data obtained from a scene with captured image data for the scene.

According to a further aspect of the invention, there is provided a method of displaying an association between RFID data obtained from a scene with captured image data for the scene.

The method may further comprise providing for user access to the RFID data by use of the image data for the scene.

According to a further aspect of the invention, there is provided a computer program, the computer program comprising computer code configured to associate RFID data obtained from a scene with captured image data for the scene.

There may also be provided a computer-readable storage medium having stored thereon a data structure configured to associate RFID data obtained from a scene with captured image data for the scene.

There may also be provided a computer program product comprising a computer-readable medium bearing computer program code embodied therein for use with a computer, the computer program code comprising:
code for associating RFID data obtained from a scene with captured image data for the scene.

There may also be provided a computer-readable medium encoded with instructions that, when executed by a computer, perform:
associating RFID data obtained from a scene with captured image data for the scene.

It will be appreciated that a "computer" can comprise a collection of one or more individual processors/processing elements that may or may not be located on the same circuit board, or the same region/position of a circuit board or even the same device. In some embodiments one or more processors may be distributed over a plurality of devices/apparatus. The same or different processor/processing elements may perform one or more of the (aforementioned or subsequent mentioned) functions described herein.

According to a further aspect of the invention, there is provided a signal comprising an association between RFID data obtained from a scene and captured image data for the scene. The signal may be recorded on a computer readable medium.

There may also be provided an electronic distribution of a computer program disclosed herein.

According to a further aspect of the invention, there is provided a means for processing configured to associate RFID data obtained from a scene with captured image data for the scene.

According to a further aspect, there is provided a user interface having a display and one or more user inputs, the user interface configured to:

display information representative of an association between RFID data obtained from a scene with captured image data for the scene to enable user selection of RFID data with which to interact.

receive user input responsive to a selection of RFID data from one or more of the inputs; and provide for interaction with RFID data in accordance with the user input.

There may be provided a method of displaying image data comprising:

receiving image data representative of a scene;

receiving an RFID data signal from an RFID data source in the scene;

recording a relative orientation from which the RFID data signal was received;

associating the orientation with a corresponding sub-region of the image data; and displaying the image data with an overlay comprising an identifier of the corresponding sub-region.

The identifier of the corresponding sub-region may be usable by a user to interact with the associated RFID data.

There may be provided a method of assembling any apparatus disclosed herein, comprising assembling an image capture sensor and/or a radio-frequency identification reader such that they are in communication with a processor.

There may also be provided a method assembling any device disclosed herein, comprising locating one or more of a processor, image capture sensor and radio-frequency identification reader in the device. An image capture sensor and/or radio-frequency identification reader may be located such that they are in communication with the processor.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

DESCRIPTION OF SPECIFIC ASPECTS/EMBODIMENTS

One or more embodiments described herein relate to a processor that is configured to associate radio-frequency identification (RFID) data obtained from a scene with captured image data for the scene. In this way, a user can take advantage of the association in order to use the RFID data by interacting with the captured image data. This can be particularly advantageous in embodiments where RFID data is received from a plurality of RFID tags/data sources, and the association between RFID data and captured image data can enable the RFID data received from different RFID tags to be discriminated from each other.

Figure 1:
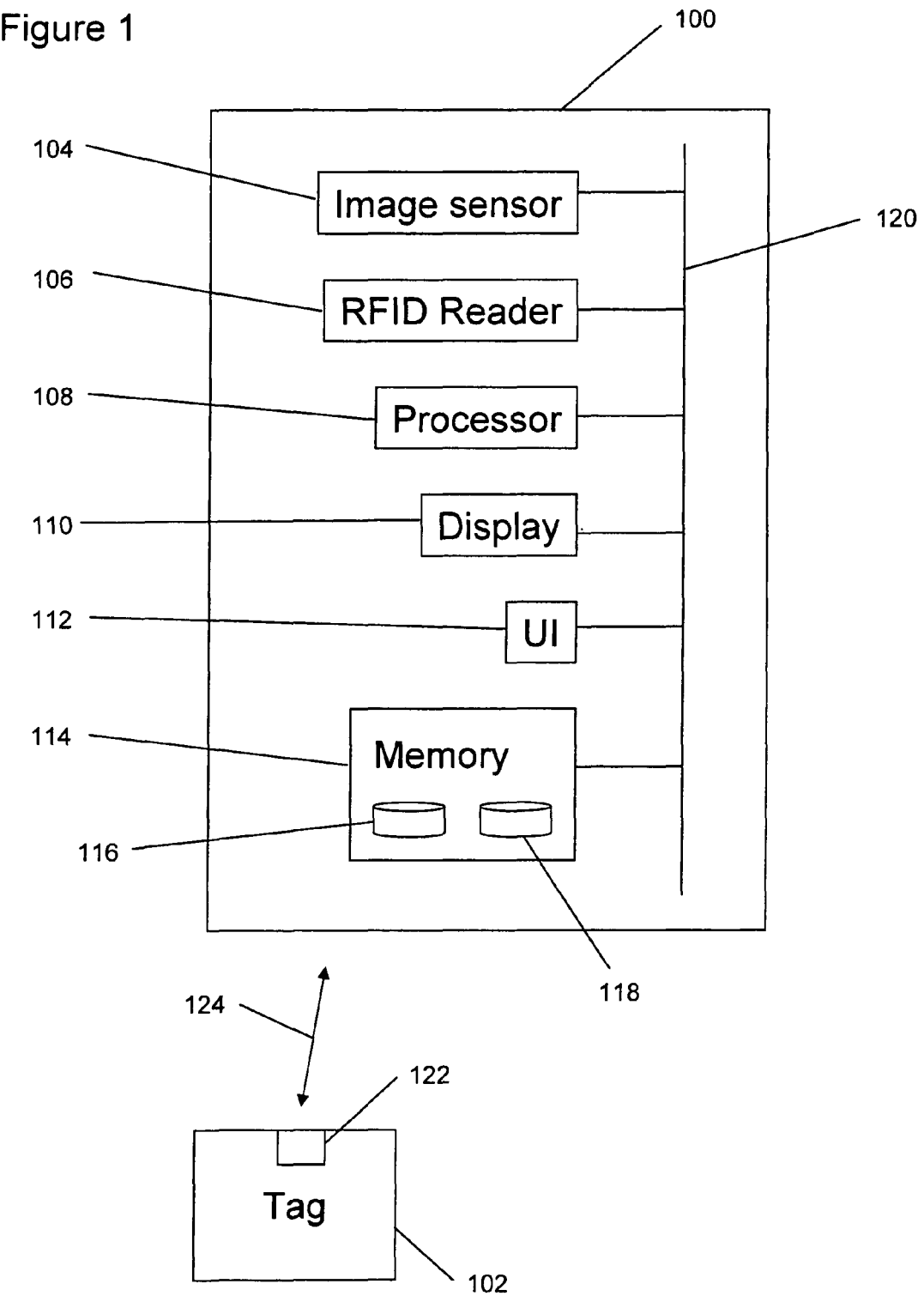
FIG. 1 illustrates an apparatus according to an embodiment of the present invention.

FIG. 1 illustrates schematically an apparatus according to an embodiment of the present invention. The apparatus comprises a device 100 and at least one RFID tag 102, which is an example of an RFID data source.

The device 100 comprise an image sensor 104, an RFID reader 106, a processor 108, a display 110, a user interface 112 and memory 114, all of which are connected together by a data bus 120.

In this example, the user interface 112 and the display 110 are separate modules/components, although in other embodiments they may be the same module/component. For example, the user interface may be configured to display information to a user and/or receive user input. An example of a user interface 112 can include a touch sensitive screen, in which case a separate display component 110 may not be required.

The image sensor 104, which may be a digital camera, is usable to capture image data from a scene for example by taking a still photograph or displaying live video footage of the scene on the display 110. The RFID reader 106 is configured to receive RFID data 124 from the RFID tag 102 and the RFID data may be received at the same time as the image data is captured. In this embodiment, the RFID reader 106 comprises a steerable antenna in order to automatically scan the scene that has been captured by the image sensor 104 and identify the location of any RFID tags 102.

The RFID reader 106 may generate output signals that can be stored in memory 114 representative of an identifier of the RFID data and a relative orientation/direction from which the RFID data was received. In some embodiments, the identifier of the received RFID data may comprise the data itself, an identifier associated with the RFID tag 102, or simply a flag that indicates that RFID data was received. In contrast to prior art examples, the RFID reader 106 does not necessarily need to have RFID tag identifiers pre-stored in memory in order to be able to distinguish between data received from a plurality of RFID tags at the same time. Embodiments that involve the use of an RFID identifier can be advantageous for use in secure applications.

The memory 114 is configured to store the captured image data and the RFID data received by the RFID reader 106, or at least some form of identifier/orientation of the RFID data.

The processor 108 is configured to associate the RFID data obtained from the scene with the captured image data relating to the scene. Associating the RFID data with the captured image data may consist of converting the data representative of the orientation from which the RFID data was received into a format that can be used to identify a corresponding location in the captured image data. This association can be presented to a user, for example on display 110, such that the user can identify which RFID data to use by interacting with the captured image data via the user interface 112.

Figure 2:
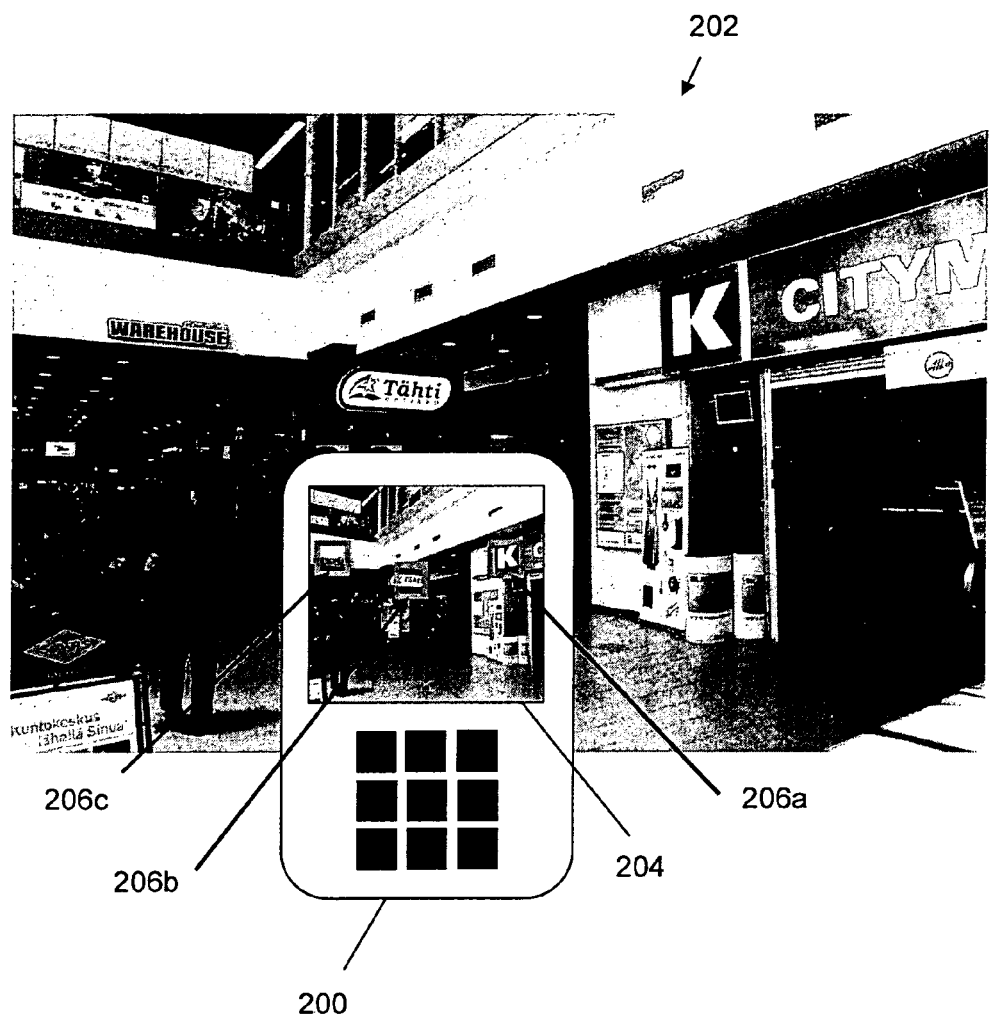
FIG. 2 illustrates an apparatus according to an embodiment of the present invention in use.

FIG. 2 illustrates an example of a device 200 in use displaying the association between RFID data and captured image data according to an embodiment of the invention.

The device 200 is shown, along with a scene 202 that is local to the device 200. In this embodiment, the device 200 is a hand-portable electronic device, such as a mobile telephone or a personal digital assistant (PDA).

A user of the device 200 has taken a photograph of the scene 202 in order to generate captured image data, and the captured image data is displayed on the display screen 204 of the device 200.

In addition, the device 200 includes a narrow beam steerable phased array antenna (not shown) that is used to scan the scene with a narrow beam in order to selectively identify RFID data that is received from an RFID data source, and the relative orientation from which that RFID data is received. An example of a suitable antenna is described below in relation to FIG. 4.

In this example, the RFID data source is an active RFID tag that acts as a beacon to transmit RFID data. In other examples, the RFID data source may be a passive RFID tag. Passive RFID tags may be useful for applications in which only a short range between the RFID reader and tag is required, a low cost solution is preferred and/or only a small amount of data is required to be transferred between the RFID tag and reader, for example. In contrast, and in some embodiments, active RFID tags can enable more information to be transferred over longer distances more efficiently that passive tags.

In this example, RFID data has been received from three distinct locations as identified by references 206a, 206b, 206c in FIG. 2, and it will be appreciated that each of the distinct locations corresponds to a different RFID tag/data source.

The device 200 comprises a processor (not shown) that can convert the locations of the RFID tag as identified by the RFID reader into a format that can be overlaid on the captured image data on the display 204. This can provide a user interface with which a user can select which of the RFID tags to interact with. In this example, the RFID tag locations are shown as boxes 206a, 206b, 206c overlaid on the image data shown on the display 204, and it can be seen that each of the identified RFID tags is associated with a different advertising board.

In some embodiments, the device 200 may periodically generate captured image data, for example when operating in a video camera mode, and the locations of the RFID tags in the captured image data can be updated for each new captured image. In this way, a user may be able to move the device 200 in order to capture images representative of different areas of a scene, and identify any RFID tags present in each of the scenes in real-time. For example, a user may be able to rotate the device 200 by 360° around a room in order to identify any RFID data sources/tags that are located in the room.

The relative orientation from which the RFID data is received at a device may be in a format that identifies the relative direction that the RFID data is received in spherical co-ordinates. The processor may be configured to transform these spherical co-ordinates into Cartesian co-ordinates that are suitable for overlaying with the captured image data. For example, a spherical co-ordinate system with a zenith angle of 0° and an azimuth angle of 0° may define an orientation that is perpendicular to the plane of the RFID reader, which may be straight out of the back of the device. Such a set of spherical co-ordinates with 0°,0° may correspond to the centre of the captured image in Cartesian co-ordinates, which may be (0,0).

The processor may utilise information representative of a typical distance from a device to objects in a scene, for example 10m, in order to apply an approximate radial distance to the angles in the spherical co-ordinate system. The process can then transform the spherical co-ordinates including the radial distance into Cartesian co-ordinates that correspond to the field of view of the captured image data. In some embodiments, any errors in estimating the radial distance in the spherical co-ordinate system may be considered acceptable due to the resolution with which the location of the RFID tag is shown with the captured image data. That is, the location of the RFID tag in the captured image data may be identified by a region that is large enough to accommodate any errors in the estimation of the radial distance of the RFID tag from the device. For example, the box that represents an RFID data source, and is illustrated on the display of a device, may encompass objects that are in a range of 5 m to 10 m from the device. The distances that are used for the range of radial distances can be configured in accordance with the known range of the RFID reader.

In other embodiments, distance measurement techniques from objects in a scene to a device may be utilised in order to more accurately generate the radial distance from the device to the RFID data source. The distance measurement techniques can be used to generate ranging information.

In further embodiments still, a fixed beam directive antenna can be used with a beam width that is considered narrow enough to receive RFID data from a single RFID tag at any given time. Antenna directivity can be expressed as the half-power (−3 dB) beamwidth $\theta_{-3\ dB}$ which depends on the size of the antenna compared to the signal wavelength: $\theta_{-3\ dB}=58.4\lambda/D$, where D is the diameter of a circular antenna aperture with uniformly distributed illumination and $\lambda$ is the wave length. Using millimeter wave frequencies (30-300 GHz), more directive links can be achieved with practical form-factors. At 90 GHz an antenna with 5×5 cm dimensions can optimally achieve a −3 dB beam width of 4°. This value may be considered small enough to enable selective direction-based RFID transmission/reception which, in turn, enables new kind of RFID applications.

In some embodiments, the data that is used to identify the location of one or more RFID tags in relation to image data may be stored as an overlay. The overlay may be of a similar format to the display of date and time that are known to be displayed in association with still and video image data. The location of RFID tag data may be considered as embedded data that is saved with each frame/image and can be displayed or not displayed with the image data dependent upon a specific application or user input. It may be possible for a user interface according to an embodiment of the invention to provide the user with functionality to decide whether or not the overlay data in relation to the RFID tag locations should be displayed. Such functionality can provide advantages as it may enable image data to be associated with RFID data without altering the image data, and in this way the image data is not spoiled and can also be used/viewed without including a display of RFID tag locations.

The development of silicon-based integrated circuits for millimeter wave frequencies can enable embodiments of the invention that use an automatic scanning planar antenna to be cost-effectively provided. High integration level and new packaging technologies also make it possible to implement suitable planar array antennas with electrical beam steering. This can eliminate the need for mechanical antenna scanning which would otherwise be required with a narrow-beam antenna system. The use of highly integrated circuits in mass production and electrically steered antennas help lower the system cost to a level that may be considered acceptable for a high-volume consumer market.

In such an embodiment using a fixed beam antenna, the director antenna can be manually scanned over a scene by a user physically moving the device 200 in order to expose different parts of the scene to the beam width of the antenna. The device 200 can comprise one or more sensors such as motion/orientation sensors in order to be able to associate received RFID data with a region of the captured image data. Example sensors can include one or more of gyroscopes, accelerometers, magnetometers and flux gates. In this way a physical orientation of the device can be determined and can be used to build up a similar display to that shown in FIG. 2, but without requiring an automatically steerable antenna.

If a user then wants to use RFID data from an identified RFID tag, they can point the device 200 (and more particularly, the fixed beam antenna) at the location of the RFID tag as indicated on the display 204, and activate a desired operation. When the device is correctly aimed at an RFID tag, the display may indicate the RFID tag is available for use, for example by changing the colour of the RFID identifier/box on the display.

Examples of how a user can interact with RFID data according to embodiments of the present invention include:

Receiving commercial information—for example, businesses may communicate information to the public by placing remote-RFID tags in signs and billboards. In this way, a customer can capture an image of a scene to determine what kind of information is available, and from where, in order to make a decision as to whether or not to download more information from those tags that he is interested in. A further example can include downloading an Internet website address from an RFID tag such that the device 200 can then be used to directly access that website without the user having to look up the website address.

Receiving information from a transducer—for example a transducer that is configured to sense environmental conditions such as temperature data, speed data, etc.

Traffic information—objects in traffic infrastructure (such as signs, traffic lights, etc) and even other road users for example, can be equipped with remote-RFID tags that can show additional information positioned on top of a video image.

Surveillance—for example people wearing remote-RFID tags can be identified from a distance in a public space.

Two-directional communication can be used between a tag and a reader in order to achieve more complex operation including control of the tag. In some embodiments, a single device may be considered as both an RFID tag and an RFID reader in order that multiple devices can communicate with each other using RFID data.

In a two-directional communication example, reflection modulation in the RFID tag can be used as a means of communication. This may allow for lower power tags or even passive tags. Retrodirective arrays that reflect the received signal back along the direction of incidence can also be used.

According to some embodiments of the invention, the type of the RFID data that is provided can be selected in relation to the frequency of the RF signals that are used to provide the RFID data. For example, for embodiments that use high frequency RF signals, such as of the order of gigahertz, this may be considered as a sufficiently high enough frequency to be able to transmit a relatively large amount of data in an acceptable timeframe.

In some embodiments, image data can be associated with RFID data in accordance with characteristics of the image data. Such characteristics can include a degree of zoom used to obtain the image data, and can also include a mode of use of an image sensor used to collect the image data, such as a frame rate of video image data. In such examples, it may be considered unnecessary to associate RFID data with the video image data at a rate that is quicker than the frame rate.

In some embodiments, a degree of zoom used by an image sensor can be considered as a characteristic of the image data, and in this way association of image data can be restricted to only areas of a scene that are portrayed by the image data, and not areas of a scene (that may be within the field of view of the antenna) that are excluded from the image data by zooming.

For example, a scanning antenna may be controlled such that it does not scan areas of a scene that are outside the field of view/boundaries of the image data due to zooming, and in this way only a sub-area of the maximum area that is scannable by an antenna is scanned. This can provide advantages in terms of saving power and/or processing time in order to scan and detect RFID data sources. In other examples, RFID data received from data sources outside of the field of view of the image data may not be associated with image data.

It will be appreciated that one or more of the above image data characteristics can be equally applicable to both still image data and video image data.

Figure 3:
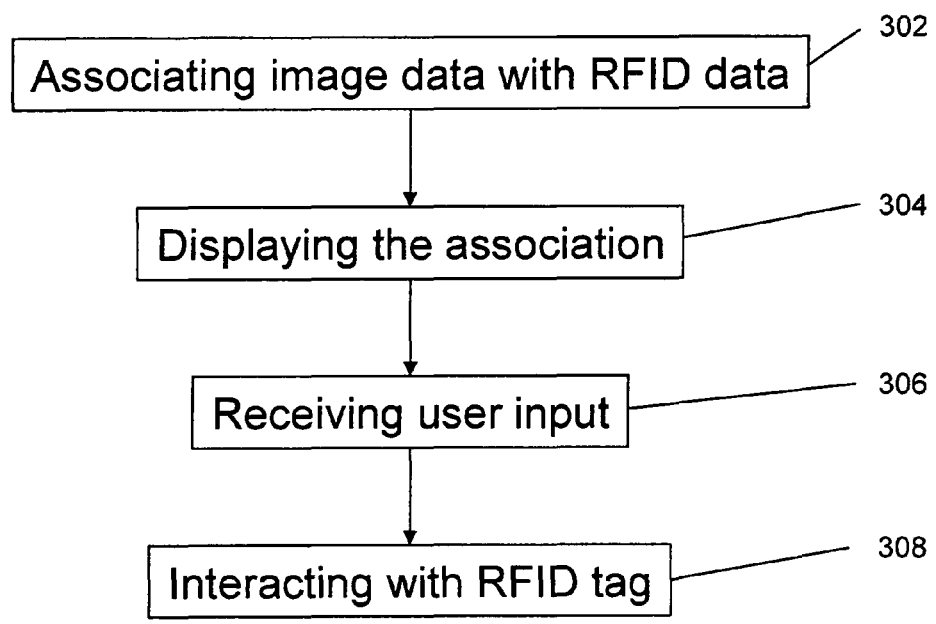
FIG. 3 illustrates schematically a method according to an embodiment of the present invention.

FIG. 3 illustrates schematically a process flow according to a method of the present invention.

At step 302, the method comprises associating image data of scene with RFID data received from the scene. This step may also comprise storing in computer memory the captured image data, the RFID data (or some form of identifier of the RFID data such as the relative direction to a source of RFID data) and/or the association between the image data and RFID data. As discussed above, the association may comprise an association between a sub-region of the image data and RFID data received from a particular source of the RFID data, such as an RFID tag, at the location corresponding to the sub-region of the image data.

The association is displayed to a user at step 304, and this may involve displaying the image data on a display screen with the locations of the sources of RFID data overlaid thereon. An example of such a display is shown in FIG. 2.

A user may interact with the display in order to select provide user input representative of a selection of one or more of the RFID data sources with which to interact, and the method may comprise receiving such user input at step 306. In examples where the display is a touch sensitive screen, the user may identify the RFID data source with which they would like to interact by simply pressing the part of the screen that displays the desired RFID data source, for example regions 206a, 206b or 206c in FIG. 2. In other embodiments, a user can use any available user interface in order to select one or more of the sources of RFID data such as by scrolling through the identified RFID data sources using navigation keys.

At step 308 the device interacts with the selected RFID tag, such as by downloading information from the RFID data source, writing information to the RFID data source or any other operation.

Figure 4:
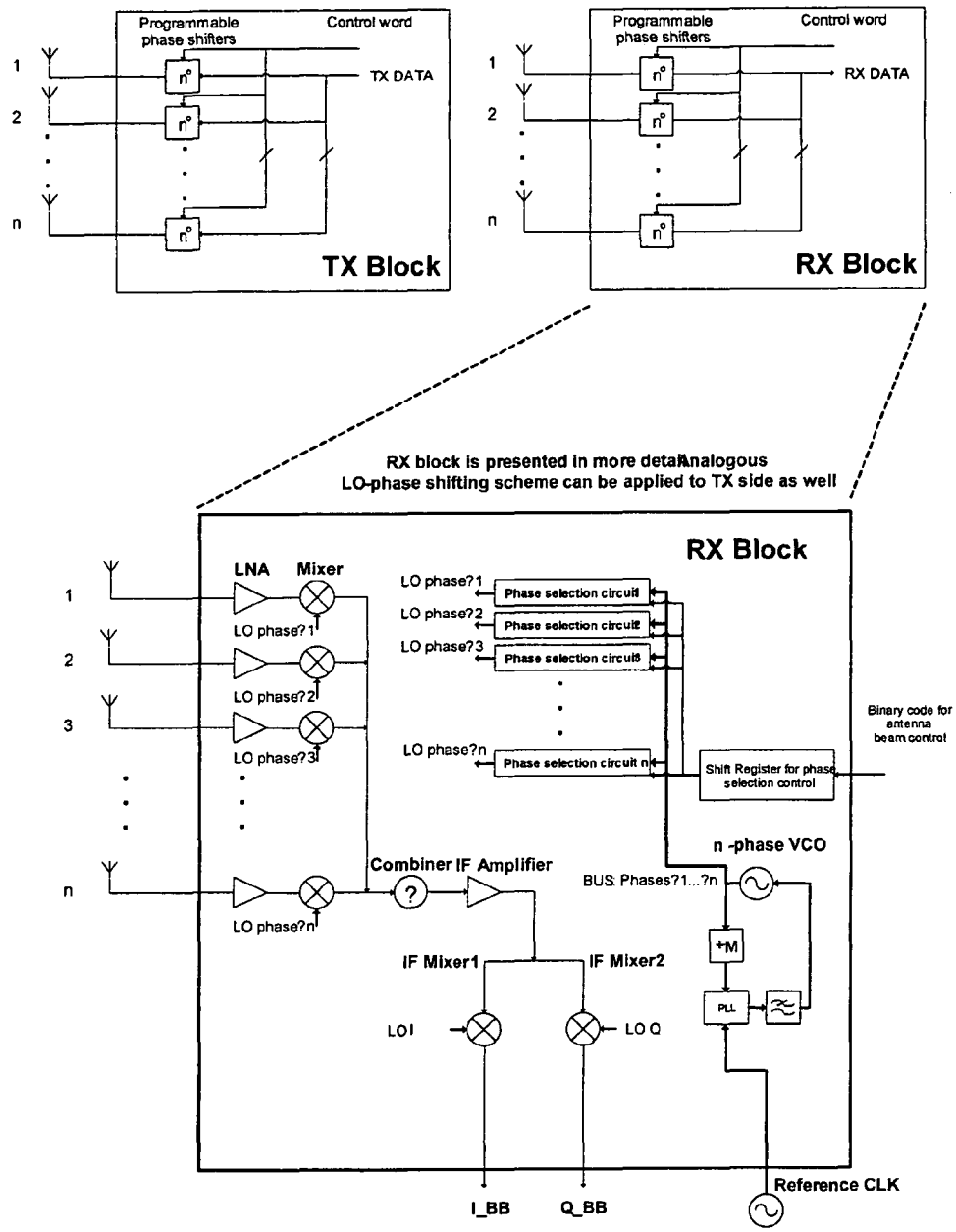
FIG. 4 illustrates an antenna that can be used with an embodiment of the present invention.

FIG. 4 illustrates a block diagram of an implementation of an electrically steered antenna array according to an embodiment of the invention.

Suitable antennas for the receiver are electrically steered planar arrays. These are small and can be produced at a low cost. The antenna consists of an array of individual wide-beam elements and increased antenna directivity can be achieved by properly phasing a local oscillator signal provided to each element. By suitably adjusting the phasing, the beam can be pointed to the desired direction without physically turning the antenna device. A block diagram of an example implementation is shown in FIG. 4. With a steerable antenna beam, the RFID reader can automatically scan the field of vision and locate the tags and read their information. The information can then be overlaid with a video image captured at the same time. Using this visual user interface the user can identify the tag information with the corresponding physical object in the image. He can then initiate a further communication sequence with the object if needed or use the information in some other application in the reader (such as open an internet connection to an address indicated by the tag).

Consumer applications that may be suited for embodiments of the invention may require low-cost components and a small size. These translate to affordable integrated circuit technology and high system integration level combined with module packaging and antenna solutions that are suitable for volume production. Recent development in silicon-based integrated circuitry (IC) technologies and multi-layer module materials has made millimeter-wave operation feasible where previously more expensive materials were required. Millimeter operation can enable RFID readers to have a sufficiently narrow antenna beam to be provided as a component that is practically small enough to be used with portable devices such as mobile telephones. One possible candidate material is deep submicron CMOS combined with LTCC (low-temperature co-fired ceramics) packaging.

It will be appreciated that an embodiment of the invention can comprise a system that consists of tags and a reader. A tag can be an active transmitter (beacon) sending a digitally modulated radio signal. The reader can be a radio receiver capable of demodulating this signal. The information rate can be very low in the transmission which allows for a very simple modulation such as on-off keying, AM, FM, BPSK, etc. The antenna radiation pattern in the receiver can be directional enough to distinguish between transmissions from two tags with a minimum angular separation $\theta_r$. The actual value of $\theta_r$ is a system parameter which is determined by practical demands of the application in question and the operational environment. When $\theta_r$ is small (for example, of the order of 5 degrees), then millimeter wave frequency range RFID signals can be used in order to achieve small enough form factors for consumer use in a portable electronic device. An example minimum is the 60 GHz range where the current regulation also provides a suitable unlicensed band. Higher or lower frequencies of RFID signals can also be used according to the application.

Embodiments of the invention disclosed herein can enable a narrow beam of a millimeter wave system to be used to address RFID tags from a further distance than prior art systems, and using only the location of the RFID tags in order to discriminate between data received from different RFID tags. The identifiers of one or more RFID tags do not need to be known before an RFID reader can interact with them.

One or more embodiments of the invention can extend the operation of RFID to a case where communication between a reader and the tag can be initiated remotely and in a selective manner. The communication can consist of reading information, writing information, control of the tag, or any combination thereof. The selectivity can be based on the properties of millimeter waves which enable the use of narrow-beam antennas in a reasonably sized device.

The system can use the superposition of a visual image captured by a camera in the reader and the information pertaining to the tags in the image. The tags can be shown/identified in the image, and the information of a specific tag can be read or the tag can be controlled by selecting it in a visual user interface. If the antenna beam is fixed instead of electrically scanned, the visual image can be used as a sight to point the antenna to the desired tag.

One or more embodiments described herein can provide a processor that is configured to receive a succession of video images, and generate an association between received RFID data and the video images that enables a user to interact with an RFID tag identified in the video images. The location of an RFID tag may be identified on video images that are displayed to a user, such that the user can select a desired RFID tag based on its location. For example, a user can select a desired RFID tag by pointing an antenna towards the RFID tag in accordance with the location shown on the video images and initiate an interaction operation with the RFID tag. The antenna may be a fixed-beam antenna, a scanning antenna, or may be any other type of antenna that can provide for data to be transmitted to, and/or received from, an RFID tag.

Figure 5:
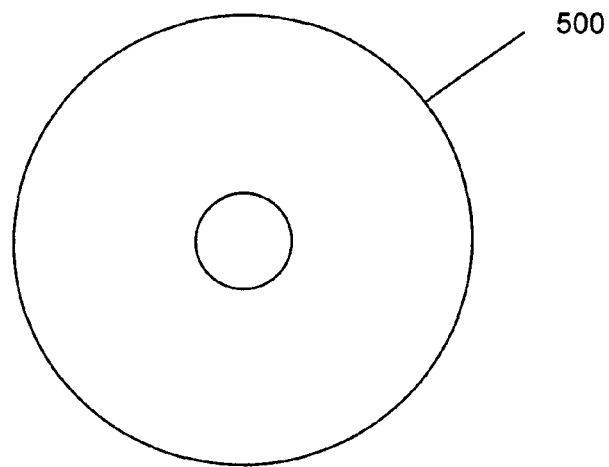
FIG. 5 illustrates schematically a computer readable media providing a program according to an embodiment of the present invention.

FIG. 5 illustrates schematically a computer/processor readable media 500 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that the apparatus/device/server and/or other features of particular apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular apparatus/device/server may be pre-programmed with the appropriate software to carry out desired operations, and the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the aforementioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

With reference to any discussion of processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
    a processor; and
    a memory including software,
        the at least one memory and the software configured to, with the at least one processor, being configured to:
        associate radio-frequency identification data obtained from a scene with captured image data for the scene, such that the radio-frequency identification data is associated with a corresponding region of the captured image data for the scene.

2. An apparatus according to claim 1, wherein the apparatus is configured to allow user access to the radio-frequency identification data by use of the image data for the scene.

3. An apparatus according to claim 1, wherein the apparatus is configured to associate the radio-frequency identification data with corresponding regions in a succession of captured video image data for the scene.

4. An apparatus according to claim 1, wherein the apparatus is configured to allow user access to the radio-frequency identification data by selection of a corresponding region of the captured image data.

5. An apparatus according to claim 1, wherein the apparatus is configured to identify a location of a source of the radio-frequency identification data in the scene and associate the radio-frequency identification data with a corresponding location on the captured image data.

6. An apparatus according to claim 1, wherein the apparatus is configured to discriminate a location of a particular source of particular radio-frequency identification data from other sources of radio-frequency identification data in the scene and associate the particular radio-frequency identification data with a corresponding particular location on the captured image data.

7. An apparatus according to claim 1, wherein the apparatus is configured to associate the radio-frequency identification data with image data based upon initiation of image capture for the scene.

8. An apparatus according to claim 1, wherein the captured image data for the scene comprises one or more still images of the scene and video image capture of the scene.

9. An apparatus according to claim 1, wherein the apparatus is configured to associate the image data with radio-frequency identification data in accordance with characteristics of the image data.

10. A method of assembling an apparatus according to claim 9, comprising: assembling the image capture sensor and radio-frequency identification reader such that they are in communication with the apparatus.

11. An apparatus according to claim 1, wherein the apparatus further comprises an image sensor to capture image data for a scene and a radio-frequency identification reader to receive radio-frequency identification data from the scene.

12. An apparatus of claim 11, wherein the radio-frequency identification reader comprises a steerable antenna.

13. A portable electronic device comprising the apparatus of claim 1.

14. An apparatus according to claim 1, wherein the apparatus is configured for processing radio-frequency identification data received from a plurality of RFID tags.

15. A method, the method comprising:
    associating radio-frequency identification data obtained from a scene with captured image data for the scene, such that the radio-frequency identification data is associated with a corresponding region of the captured image data for the scene.

16. A method according to claim 15, further comprising allowing user access to the radio-frequency identification data by use of the image data for the scene.

17. A computer program product, the computer program product comprising computer code stored on a non-transitory storage medium configured to:
    associate radio-frequency identification data obtained from a scene with captured image data for the scene, such that the radio-frequency identification data is associated with a corresponding region of the captured image data for the scene.

18. A user interface having a display and one or more user inputs, the user interface configured to:
    display information representative of an association between radio-frequency identification data obtained from a scene with captured image data for the scene to enable user selection of radio-frequency identification data with which to interact, wherein the association is between the radio-frequency identification data and a corresponding region of the captured image data for the scene;
    receive user input responsive to a selection of radio-frequency identification data from one or more of the inputs; and
    provide for interaction with radio-frequency identification data in accordance with the user input.

* * * * *

UNITED STATES PATENT AND TRADEMARK OFFICE
CERTIFICATE OF CORRECTION

| | | |
|---|---|---|
| PATENT NO. | : 8,810,401 B2 | Page 1 of 1 |
| APPLICATION NO. | : 13/255085 | |
| DATED | : August 19, 2014 | |
| INVENTOR(S) | : Timo Petteri Karttaavi et al. | |

It is certified that error appears in the above-identified patent and that said Letters Patent is hereby corrected as shown below:

On the title page, item "(75) Inventors:", correct the name of second inventor as follows:

"Ikka-Hermanni Hakala" should read as --Ilkka-Hermanni Hakala--.

Signed and Sealed this
Seventeenth Day of March, 2015

Michelle K. Lee
*Director of the United States Patent and Trademark Office*